United States Patent Office 3,401,158
Patented Sept. 10, 1968

3,401,158
CATIONIC HETEROCYCLIC DISAZO DYES
FOR TEXTILE FIBERS
John G. Fisher and Clarence A. Coates, Jr., Kingsport,
Tenn., assignors to Eastman Kodak Company, Rochester, N.Y., a corporation of New Jersey
No Drawing. Filed Oct. 22, 1965, Ser. No. 502,428
7 Claims. (Cl. 260—158)

ABSTRACT OF THE DISCLOSURE

Cationic azo compounds containing two azolyl-azoindolyl moieties in which the nitrogen atoms of the indolyl groups are joined together by certain bisurea or bisurethane groups are useful as dyes for acrylonitrile polymer textile material.

---

This invention relates to novel heterocyclic azo compounds and, particularly, to novel cationic heterocyclic azo dyes for synthetic fibers, yarns and fabrics.

The novel cationic heterocyclic azo compounds of the invention are characterized by the general formula

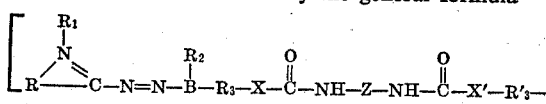

wherein

A and A' represent the same or different radical or group

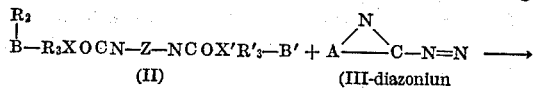

of atoms necessary to complete the heterocyclic ring, which ring may be a 2-thiazole ring, a 2-benzothiazole ring, a 1,3,4-thiadiazole-2-yl ring or a benzimidazole ring and the like;
$R_1$ represents a lower alkyl radical, e.g. methyl, or a benzyl radical;
B represents an indolyl radical;
$R_2$ and $R'_2$ represent the same or different alkyl radicals, e.g. methyl, ethyl and the like or the same or different monocyclic carbocyclic aromatic radicals, e.g. phenyl or substituted phenyl such as tolyl and the like or combinations thereof;
$R_3$ and $R'_3$ present straight or branched-chain lower alkylene radical, e.g. methylene, ethylene and the like;
X and X' represent —O— or —NH— and may be the same or different;
Z represents alkylene, e.g. hexamethylene; arylene, e.g. phenylene, p-phenylene, p-xylylene; alkarylene, e.g. methylenebis (phenylene); aralkylene, e.g. tolylene, xylylene or naphthalene and the like; and
Y represents an anionic material, e.g. $CH_3SO_4(-)$ or

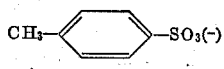

and the like.

The heterocyclic azo dyes of the invention are prepared by two principal methods. The choice of method is dependent on whether the desired dye is to be symmetrical or unsymmetrical.

If it is desired that the dye be symmetrical in structure, a bis urea or bis urethane coupling component having the formula

wherein all symbols are defined above and wherein the prime symbols are the same as the principal symbols, is coupled with two equivalents of the diazonium salt of a heterocyclic compound having the formula

wherein A is defined above. Thus, the product of the coupling reaction of a compound of formula II with a compound of Formula III has the nonquaternized form of the structure of Formula I wherein the principal and prime symbols represent the same structures. The coupling reaction is conventional and and will be more fully described in the examples set forth hereinafter. Upon obtaining a compound having the structure of Formula I in the nonquaternized form, the compound is quaternized with an alkylating agent to provide the symmetri-

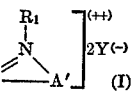

cal cationic heterocyclic azo dyes of the invention. Thus, the reaction sequence is illustrated as follows:

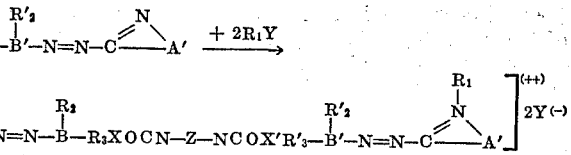

The bis coupling components of Formula II are prepared by reacting two moles of an N-hydoxyalkyl- or N-aminoalkylindole having the formula

wherein the symbols are defined above, with one mole of a diisocyanate having the formula

OCN—Z—NCO          (V)

wherein Z is defined above. When X is oxygen, the bis coupling component will be a urethane and when X is —NH, the bis coupling component will be a urea.

If it is desired that the dye be unsymmetrical in structure, a different method than that described above is used. To prepare the unsymmetrical heterocyclic azo dye, the diazonium salt of a heterocyclic compound having the structure of Formula III is coupled with the indole derivative of Formula IV. The monoheterocylic dye thus prepared has the formula

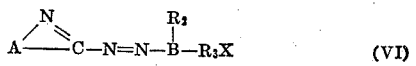

wherein the symbols are defined above. By subsequently reacting the dye of Formula VI with a diisocyanate of Formula V, a product is obtained which has the formula

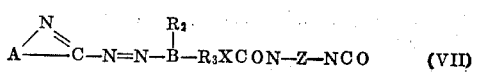

Upon reaction of the compound of Formula VIII with a second dye having the Formula VI, a dye having the structure

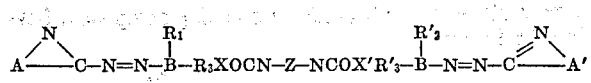

is obtained. Upon quaternization, a compound of Formula I is obtained. The reaction sequence is as follows:

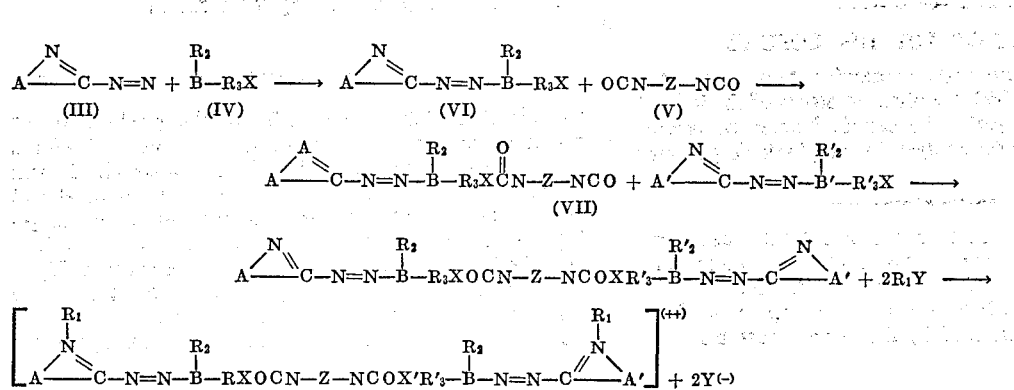

The following examples will illustrate the preparation of representative coupling components and dyes prepared therefrom.

PREPARATION OF COUPLERS

To a well stirred solution of 3.75 g. of p.p′-methylenebis (phenylisocyanate) in 20 ml. of dry benzene, a solution of 7.5 g. of 1-γ-aminopropyl-2-phenyl indole in 25 ml. of benzene was added. The resultant solution was stirred and heated at reflux for 3 hr. After allowing to cool to room temperature the white solid product was filtered off, washed with benzene and then recrystallized from benzene. An 85% yield was obtained. Analysis was as follows, with the theoretical values in parentheses. C, 78.47 (78.48); H, 6.30 (6.14); mol. wt., 775 (750).

This coupler has the structure:

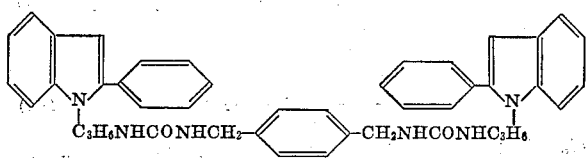

Coupler No. 1

Following the above procedure but substituting p-xylylene diisocyanate, the following coupler was obtained.

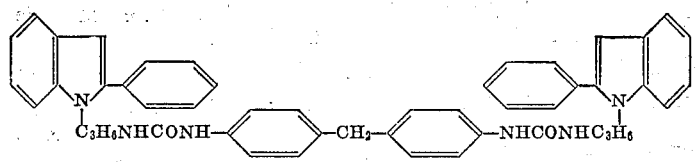

Coupler No. 2

Yield=82%, M.P. 220–222° C.

*Analysis.*—C, 76.20 (76.70); H, 6.73 (6.40); mol. wt. 680 (688).

Following the above procedure but substituting m-tolylene diisocyanate, the following coupler was obtained.

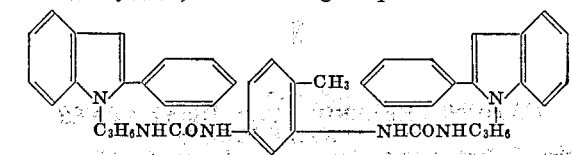

Coupler No. 3

Yield, 82.5%, M.P. 182–186° C.

C, 76.15 (76.52); H, 6.71 (6.25); mol. wt. 630 (674).

All the other couplers used in the dyes of the invention were prepared as described in the procedure illustrated above. If, in the above illustrations, a hydroxyalkylindole is substituted, the bis coupling component is a urethane.

PREPARATION OF SYMMETRICAL DYES

Example 1

A solution of nitrosyl sulfuric acid, prepared from 0.72 g. of $NaNO_2$ and 5 ml. of conc. $H_2SO_4$, was added to 10 ml. of 1:5 acid (1 part propionic:5 parts acetic acid) below 20° C. This solution was cooled to 2° C. and 1 g. of 2-aminothiazole was added portionwise keeping the temperature below 5° C. After a second portion of 10 ml. of 1:5 acid was added, the diazotization was completed by stirring at 3–5° C. for 2 hr. It was then added to a cooled slurry of 3.75 g. of coupler No. 1, above, in 100 ml. of 1:5 acid. The coupling mixture immediately turned dark red. It was adjusted to a pH of 4.5 by addition of solid ammonium acetate taking care that the temperature was held at 10° C. or below. After 2 hr. standing with intermittent stirring the dye was isolated by drowning in water, filtering, washing with water and allowing to air dry. The dried dye was dissolved in 30 ml. of dimethylsulfate by heating and the quaternization was completed by heating at 95–100° C. for 1.5 hr. The red solution was drowned in 300 ml. of ether, the solid product was collected on a funnel, washed with ether and dried in a vacuum. It dyes Orlon and Verel in red shades which exhibit excellent fastness to light washing and sublimation. It has the formula:

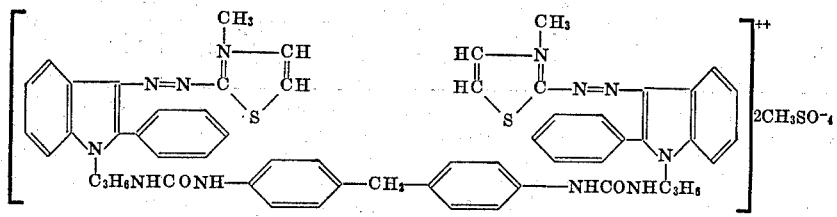

Example 2

If the coupler in Example 1 is replaced by 3.44 g. of coupler No. 2 and the quaternization carried out as described in Example 1, then another red dye results which also dyes Orlon and Verel in fast red shades. It has the formula:

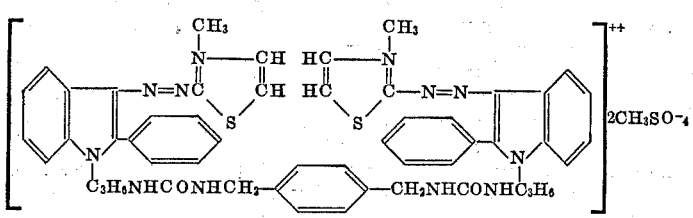

If a purer sample is desired, the dye may be dissolved in water by warming, filtering and the dye precipitated by addition of NaI. In such case the anion of the dye is iodide ion.

Example 3

If the coupler in Example 2 is replaced by coupler No. 3, the following dye is obtained:

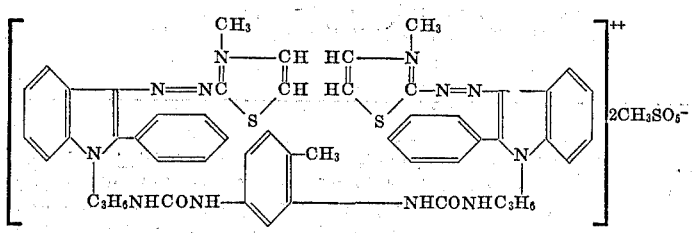

This dye imparts red shades to acrylic fibers which exhibit very good fastness properties as regards light and wet treatment.

Example 4

An amount of 1.5 g. of 2-aminobenzothiazole was dissolved in 12.6 ml. of water and 5.8 ml. of concentrated sulfuric acid. This solution was cooled in an ice-salt bath and tested with nitrosyl sulfuric acid, made from 0.72 g. of sodium nitrite and sulfuric acid. The diazotization was complete after stirring at 3–5° C. for 1½ hrs. The diazo solution was added to 3.75 g. of coupler No. 1, dissolved in acetic acid and cooled in an ice bath. The pH of the coupling mixture was adjusted to about 5 by the addition of sodium acetate. After 1 hr. the coupling solution was diluted to 1 l. by addition of water, and the solid collected on a funnel, washed with water, and dried. The dried cake was heated in 40 ml. of dimethyl sulfate at 95–100° C. for 1½ hrs. This solution was cooled to 25° C. and poured slowly with good stirring into 350 ml. of ether. The dye was then collected, washed with ether, and dried in a vacuum desiccator. This dye imparts red shades to acrylic fibers and has the following structure:

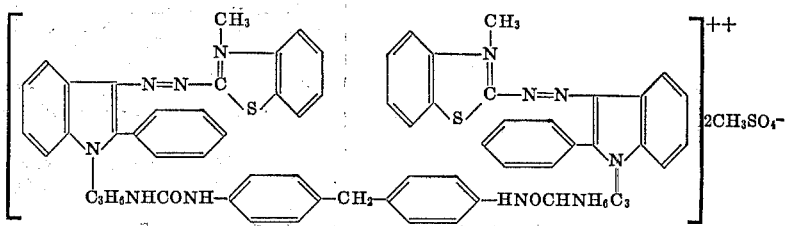

All the dyes in the examples illustrated in Table I, below, were prepared as described in the foregoing examples.

The table headings correspond to Formula I, except that A=A', $R_2$=$R'_2$, etc. since these are symmetrical dyes.

TABLE I

| Example No. | A | $R_1$ | $R_2$ | $R_3$ | X | Z | Y | Shade on Orlon |
|---|---|---|---|---|---|---|---|---|
| 5 | (benzothiazole) | $CH_3$ | (phenyl) | $-C_3H_6-$ | $-NH-$ | (tolyl-$CH_3$) | $CH_3SO_4$ | Red-violet. |
| 6 | (benzothiazole) | $CH_3$ | (phenyl) | $-C_3H_6-$ | $-NH-$ | $-CH_2-\langle\rangle-CH_2-$ | $CH_3SO_4$ | Bluish-red. |
| 7 | (thiazole) | $CH_3$ | (phenyl) | $-C_3H_6-$ | $-NH-$ | $-CH_2-\langle\rangle-CH_2-$ | I | Orange. |
| 8 | (N-methyl-benzothiazole-like) | $CH_3$ | (phenyl) | $-C_3H_6-$ | $-NH-$ | $-CH_2-\langle\rangle-CH_2-$ | $CH_3SO_4$ | Red. |
| 9 | (N-methylimidazole) | $CH_3$ | $CH_3$ | $-C_3H_6-$ | $-NH-$ | $\langle\rangle-CH_2-\langle\rangle$ | I | Yellowish-orange. |
| 10 | (thiazole) | $CH_3$ | $CH_3$ | $-C_3H_6-$ | $-NH-$ | $-C_6H_{12}-$ | $CH_3SO_4$ | Red. |
| 11 | $CH_3S-C$ (thiazole) | $CH_3$ | $CH_3$ | $-C_2H_4-$ | O | $CH_2-\langle\rangle-CH_2$ | I | Orange. |
| 12 | $CH_3O$-(benzothiazole) | $CH_3$ | $CH_3$ | $-C_2H_4-$ | O | $\langle\rangle-CH_2-\langle\rangle$ | $CH_3SO_4$ | Violet. |

PREPARATION OF UNSYMMETRICAL DYES

Example 13

An amount of 1.99 g. of the dye prepared from 2-diazobenzothiazole and 1-γ-aminopropyl-2-phenylindole was dissolved in 50 ml. of dimethylformamide, then 0.87 g. of tolylene 2,4-diisocyanate was added. After stirring at room temperature for one-half hr. the solution was heated and stirred at 95–100° C. for 2 hr. 1.75 g. of the dye prepared from 2-diazothiazole and 1-γ-aminopropyl-2-phen- ylindole was added. After stirring and heating for 72 hrs. the orange solution was drowned in water and the solid product isolated, washed with water and dried. This dye cake was dissolved in 25 ml. of dimethyl sulfate and heated at 95–100° C. for 1.5 hr. The red solution was drowned in ether, the solid collected on a funnel, washed with ether and dried in vacuum. It dyes Orlon and Verel in fast red shades. This dye has the formula:

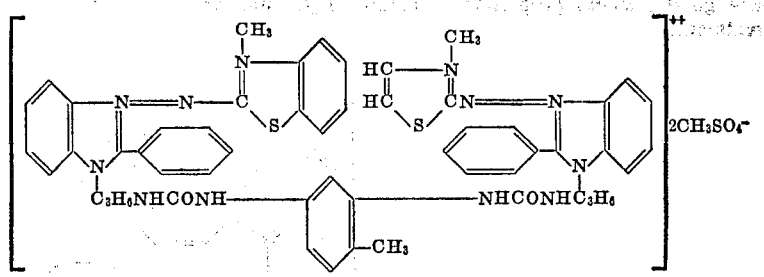

The unsymmetrical bis azo dyes illustrated by the examples in Table II, below, were prepared from the appropriate heterocyclic azo dyes reacted stepwise with the diisocyanate indicated by the procedure of Example 13. The column headings correspond to Formula I.

TABLE II

| Example No. | A | A' | R₁ | R₂ | R'₂ | R₃ | R'₃ |
|---|---|---|---|---|---|---|---|
| 14 | N=CH–S– | HC=CH–S– | $CH_3$ | (phenyl) | (phenyl) | $-C_3H_6-$ | $-C_3H_6-$ |
| 15 | HC=CH–S– | HC=CH–S– | $CH_3$ | (phenyl) | $CH_3$ | $-C_3H_6-$ | $-C_2H_6-$ |
| 16 | (phenyl)–N(CH₃)– | (phenyl)–S– | $CH_3$ | (phenyl) | (phenyl) | $-C_3H_6-$ | $-C_3H_6-$ |
| 17 | N=CH–N(CH₃)– | $CH_3O$–(phenyl)–S– | $CH_3$ | (phenyl) | (phenyl) | $-C_3H_6-$ | $-C_3H_6-$ |
| 18 | HC=CH–S– | (phenyl)–S– | $CH_3$ | $CH_3$ | $CH_3$ | $-C_2H_4-$ | $-C_2H_4-$ |

| Example No. | X | X' | Z | Y | Color on Orlon |
|---|---|---|---|---|---|
| 14 | NH | NH | $-CH_2-$(phenyl)$-CH_2-$ | I | Yellowish-red. |
| 15 | NH | NH | $-$(phenyl)$-CH_2-$(phenyl)$-$ | $CH_3SO_4$ | Red. |
| 16 | NH | NH | $-CH_2-$(phenyl)$-CH_2-$ | $CH_3SO_4$ | Bluish-red. |
| 17 | NH | NH | $-CH_2-$(phenyl)$-CH_2-$ | $CH_3SO_4$ | Red. |
| 18 | O | O | $-$(phenyl)$-CH_2-$(phenyl)$-$ | $CH_3SO_4$ | Red. |

The cationic heterocyclic azo dyes of the invention can be used for dying synthetic polymer fibers, yarns and fabrics giving a variety of fast orange to red-violet shades when applied thereto by conventional dye methods. In general, the dyes have improved fastness, for example, to washing, gas (atmospheric fumes) and sublimation.

As described above, the present cationic heterocyclic azo dyes are characterized by a structure which is distinct from other known dyes. This distinctive structure imparts unexpected properties to the present dyes, especially when they are used for dyeing textiles, including improved brightness and fastness to light. Thus, the dyes of the invention can be expected to be superior to similar but distinct dyes when tested by methods such as described in the A.A.T.C.C. Technical Manual, 1964 edition, depending in part upon the particular dye used and the fiber being dyed.

Textile materials dyed by the cationic heterocyclic azo dyes of the invention are characterized by containing at least about 35% combined acrylonitrile units and up to about 95% acrylonitrile units, and modified, for example, by 85–5% of vinyl pyridine units as described in U.S. Patents 2,990,393 (Re. 25,533) and 3,014,008 (Re. 25,539) or modified by 65–5% of vinylpyrrolidone units, for example, as described by U.S. Patent 2,970,783, or modified with 65–5% acrylic ester or acrylamide units as described in U.S. Patents 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Patent 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

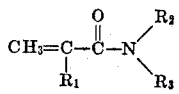

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

A particularly efficacious group of modacrylic polymers is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R_1$, $R_2$ and $R_3$ are as described above. Specific polymers of that group contain 70–95% by weight of (A) a copolymer of from 30–65% by weight of vinylidene chloride and 70–35% by weight of acrylonitrile and (B) 30–5% by weight of a lower-N-alkylacrylamide polymer such as poly-N-methacrylamide, poly-N-isopropylacrylamide and poly-N-tertiarybutylacrylamide.

The following example illustrates one way in which the cationic heterocyclic azo dyes of the invention can be used to dye acrylonitrile polymer textile material. An amount of 0.1 gram of dye is dissolved by warming in 5 cc. of methyl Cellosolve. A 2% aqueous solution of a non-ionic surfactant, such as Igepal CA (a polymerized ethylene oxidealkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of Orlon 42, the dyeing is carried out at the boil for one hour. In the case of materials made of Verel acrylic fiber the dyebath temperature should not exceed 90° C. in order to avoid damage to the fiber. The dyed material is then washed well with water and dried.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A symmetrical or unsymmetrical azo compound having the formula

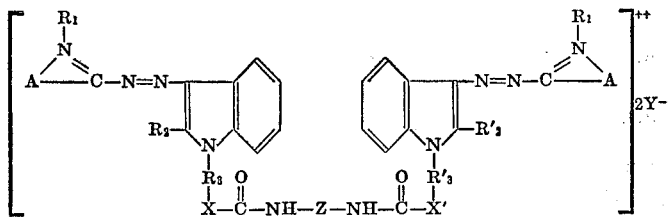

wherein:

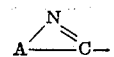

represents 2-thiazolyl, 2-benzothiazolyl, 6-methoxy-2-benzothiazolyl, 1,3,4-thiadiazol-2-yl, 5-methylthio-1,3,4-thiadiazol-2-yl, 1-lower alkyl-2-benzimidazolyl, 1-benzyl-2-benzimidazolyl, 1-lower alkyl-1,3,4-triazol-2-yl, or 1-benzyl-1,3,4-triazol-2-yl, wherein the nitrogen atom to which $R_1$ is attached is at the 3-position;

$R_1$ represents lower alkyl or benzyl;
$R_2$ and $R'_2$ each represents methyl, ethyl, phenyl, or tolyl;
$R_3$ and $R'_3$ each represents lower alkylene;
X and X' each represents —O— or —NH—;
Z represents alkylene having up to 6 carbon atoms, phenylene, phenylene substituted with methyl, 4,4'-bis(phenylene) methylene, or 1,4-dimethylenephenylene; and
Y represents an anion.

2. A compound according to claim 1 wherein

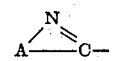

represents 2-thiazolyl or 2-benzothiazolyl;
$R_1$ represents lower alkyl;
$R_2$ and $R'_2$ each represent phenyl; and
Z represents phenylene, phenylene substituted with methyl, 4,4'-bis(phenylene)methylene, or 1,4-dimethylenephenylene.

3. The compound

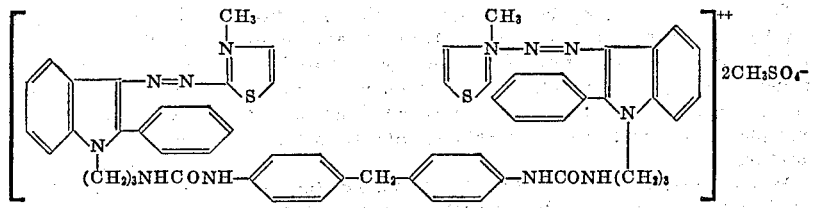

4. The compound

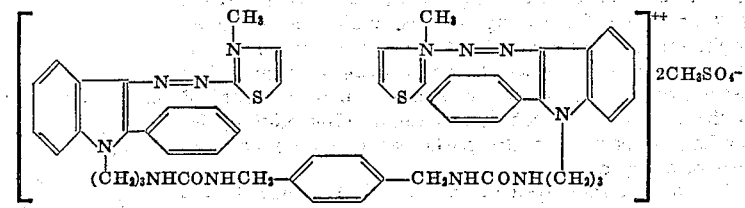

5. The compound

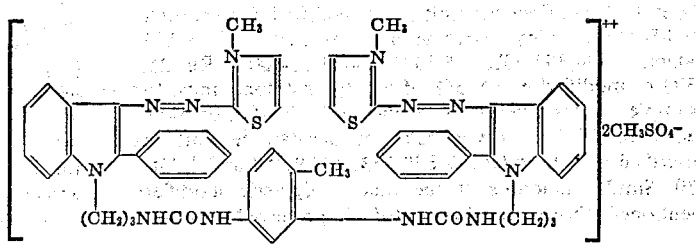

6. The compound
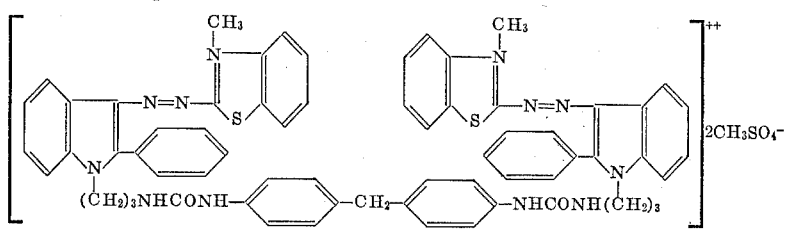
7. The compound
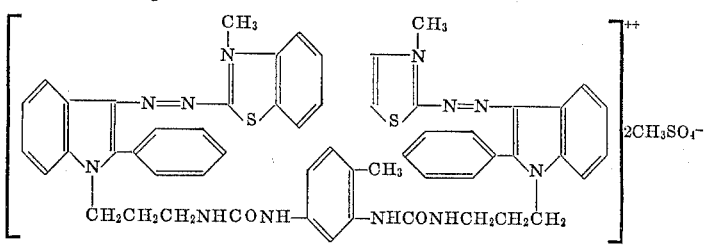
References Cited
UNITED STATES PATENTS
3,271,383  9/1966  Yamaya et al. _____ 260—158
CHARLES B. PARKER, *Primary Examiner.*
D. M. PAPUGA, *Assistant Examiner.*

UNITED STATES PATENT OFFICE
CERTIFICATE OF CORRECTION

Patent No. 3,401,158                                      September 10, 1969

John G. Fisher et al.

It is certified that error appears in the above identified patent and that said Letters Patent are hereby corrected as shown below:

Columns 1 and 2, lines 24 to 29, the formula should appear as shown below:

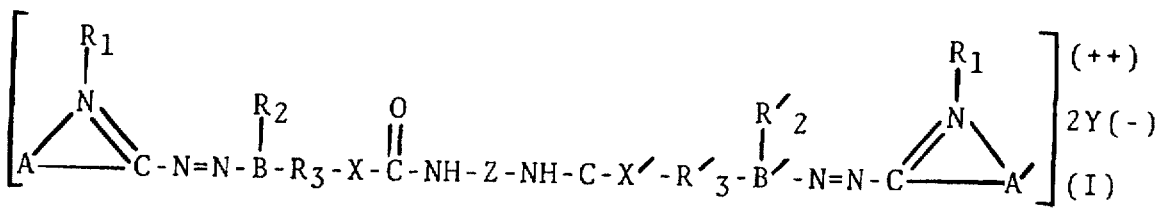

Column 1, line 35 "(III-diazonium" should read -- (III-diazonium --. Column 3, line 1, "VIII" should read -- VII --; lines 3 to 10, the formula should appear as shown below:

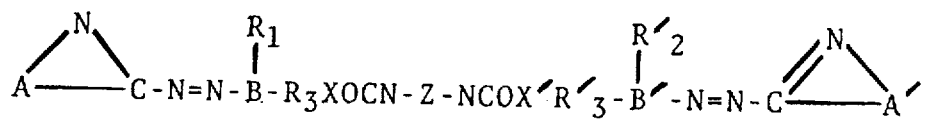

Columns 5 and 6, in each of the formulas of Examples 1, 2 and 3, "$2CH_3SO^-_4$" and "$2CH_3SO_5^-$" should read -- $2CH_3SO_4^-$ --. Column 12, lines 25 to 56, the formula should appear as shown below:

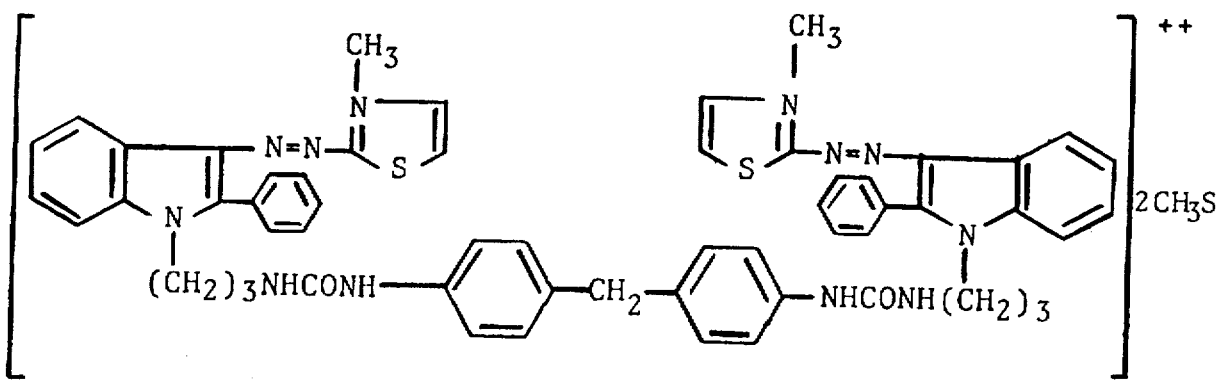

same column 12, lines 57 to 67, the formula should appear as shown below:

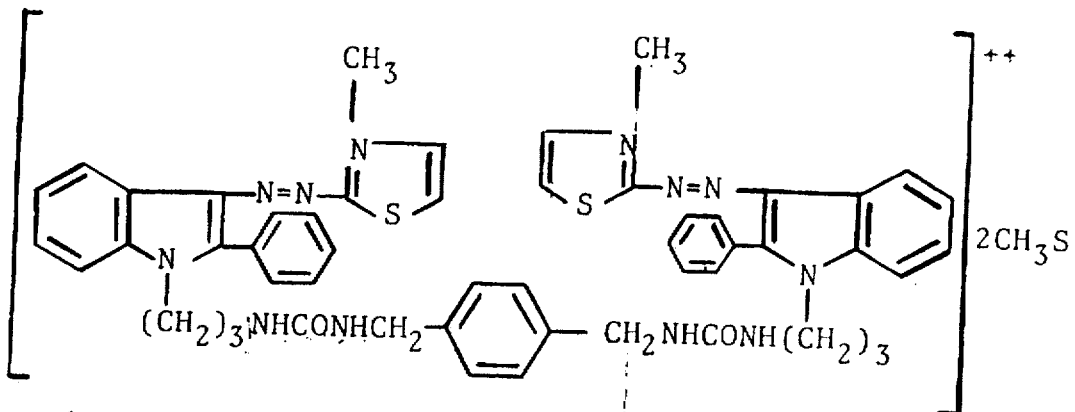

Signed and sealed this 10th day of March 1970.

(SEAL)
Attest:

EDWARD M. FLETCHER, JR.
Attesting Officer

WILLIAM E. SCHUYLER, JR
Commissioner of Patents